(12) United States Patent
Mankovskii

(10) Patent No.: US 10,089,261 B2
(45) Date of Patent: Oct. 2, 2018

(54) DISCRIMINATING DYNAMIC CONNECTION OF DISCONNECTABLE PERIPHERALS

(71) Applicant: CA, INC., New York, NY (US)

(72) Inventor: Serguei Mankovskii, San Ramon, CA (US)

(73) Assignee: CA, INC., New York, NY (US)

(*) Notice: Subject to any disclaimer, the term of this patent is extended or adjusted under 35 U.S.C. 154(b) by 203 days.

(21) Appl. No.: 15/068,116

(22) Filed: Mar. 11, 2016

(65) Prior Publication Data

US 2017/0262391 A1 Sep. 14, 2017

(51) Int. Cl.
| | |
|---|---|
| *G06F 3/00* | (2006.01) |
| *G06F 5/00* | (2006.01) |
| *G06F 15/16* | (2006.01) |
| *G06F 17/30* | (2006.01) |
| *G06F 7/04* | (2006.01) |
| *H04L 29/06* | (2006.01) |
| *G06F 12/00* | (2006.01) |
| *G06F 12/14* | (2006.01) |
| *G11C 7/00* | (2006.01) |
| *G06F 13/20* | (2006.01) |
| *G06F 13/40* | (2006.01) |
| *G06F 13/42* | (2006.01) |
| *G06F 13/38* | (2006.01) |

(52) U.S. Cl.
CPC ............ *G06F 13/20* (2013.01); *G06F 13/385* (2013.01); *G06F 13/4068* (2013.01); *G06F 13/4282* (2013.01); *G06F 2213/0042* (2013.01)

(58) Field of Classification Search
CPC ............... G06F 1/1632; G06F 13/4068; G06F 13/4081; G06F 21/445; G06F 2009/45587; G06F 21/50; G06F 21/53; G06F 21/56; G06F 21/74; G06F 21/85; G06F 21/82; G06F 2221/2129; G06F 2221/2149
USPC ................................ 710/36, 46, 8; 726/19, 4
See application file for complete search history.

(56) References Cited

U.S. PATENT DOCUMENTS

| | | | |
|---|---|---|---|
| 8,646,082 B2 * | 2/2014 | Lomont | G06F 21/85 726/24 |
| 2005/0251589 A1 * | 11/2005 | Wang | G06F 21/31 710/5 |

(Continued)

OTHER PUBLICATIONS

Kastrenakes, "USB Condom protects your devices from nasty ports", The VERGE, Sep. 13, 2013.

*Primary Examiner* — Faisal M Zaman
(74) *Attorney, Agent, or Firm* — Vierra Magen Marcus LLP

(57) ABSTRACT

An enterprise wide data processing system includes at least one watchdog unit and/or software service that is configured to automatically detect an attempt to connect a dynamically connectable and disconnectable peripheral (DCP) such as a USB stick to a watchdog-watched Dynamic Connection-Making Mechanism (DCMM) of the system. The watchdog unit and/or software service is further configured to automatically determine if a type of the attempted connection is in accordance with at least one of a local list of connection permissions and connection rules, and if not to prevent an operatively effective connection to be actually made by way of the watchdog-watched DCMM. The system further includes a remotely modifiable storage storing the at least one of the local list of connection permissions and connection rules.

18 Claims, 3 Drawing Sheets

(56) References Cited

U.S. PATENT DOCUMENTS

| | | | |
|---|---|---|---|
| 2010/0050238 A1* | 2/2010 | Fuccello | H04L 63/0236 726/4 |
| 2010/0177487 A1* | 7/2010 | Arshad | G06F 21/86 361/737 |
| 2011/0030030 A1* | 2/2011 | Terpening | G06F 21/6236 726/1 |
| 2013/0311684 A1* | 11/2013 | Dabbiere | G06F 13/385 710/36 |
| 2014/0223543 A1* | 8/2014 | Jeansonne | G06F 21/53 726/16 |
| 2014/0282816 A1* | 9/2014 | Xie | H04L 63/0227 726/1 |
| 2015/0074824 A1* | 3/2015 | Toda | G06F 21/78 726/28 |
| 2015/0365237 A1* | 12/2015 | Soffer | H04L 9/3234 726/20 |
| 2016/0014130 A1* | 1/2016 | Livneh | G06F 21/82 726/4 |
| 2016/0373408 A1* | 12/2016 | Wentworth | H04L 63/0227 |
| 2017/0076081 A1* | 3/2017 | Raskin | G06F 21/34 |

* cited by examiner

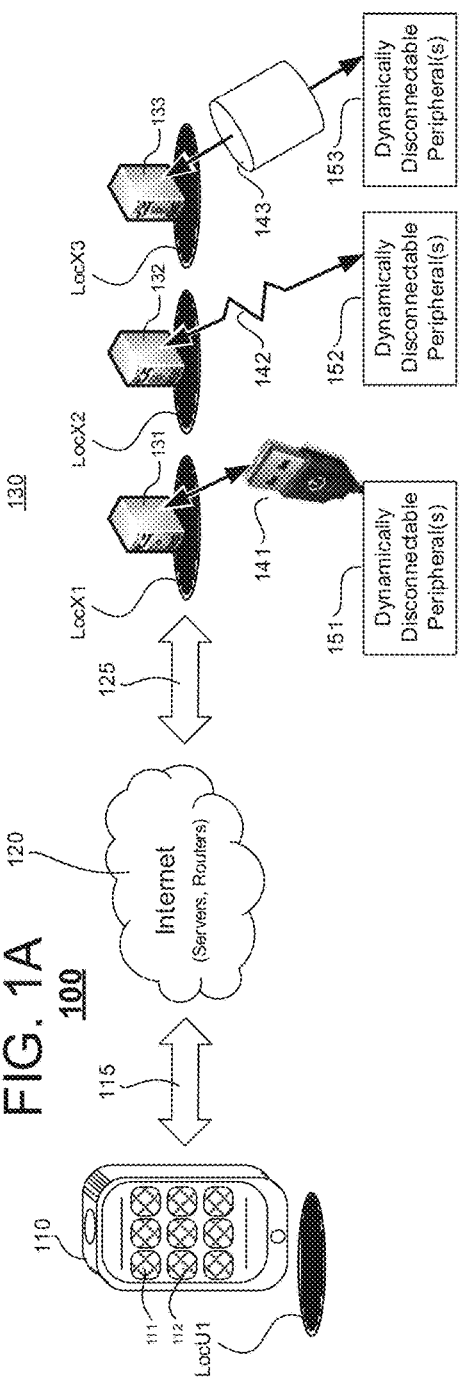
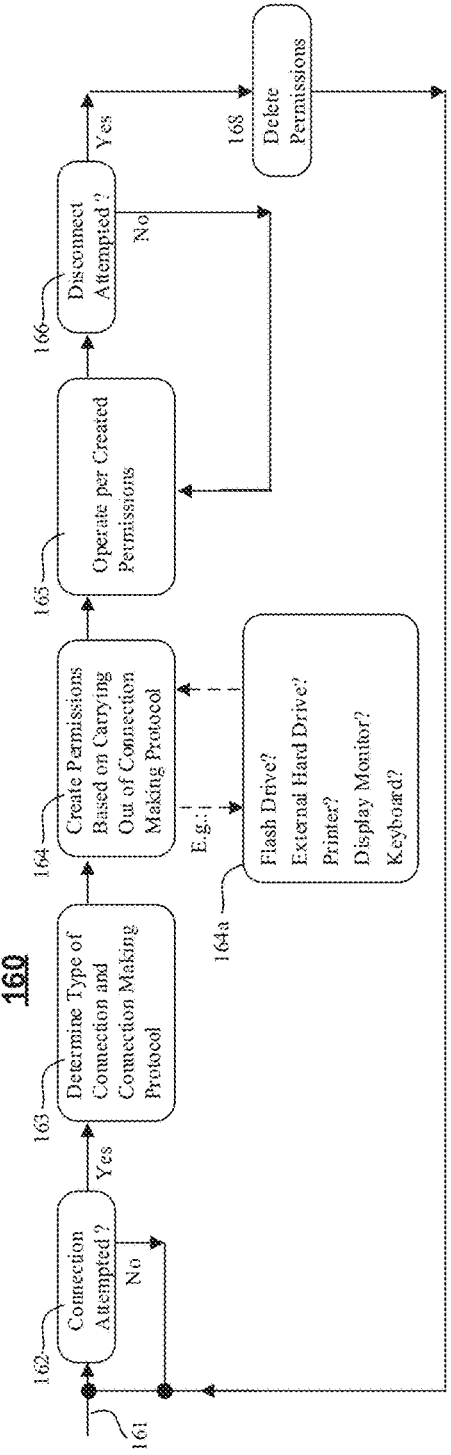
FIG. 1A
FIG. 1B

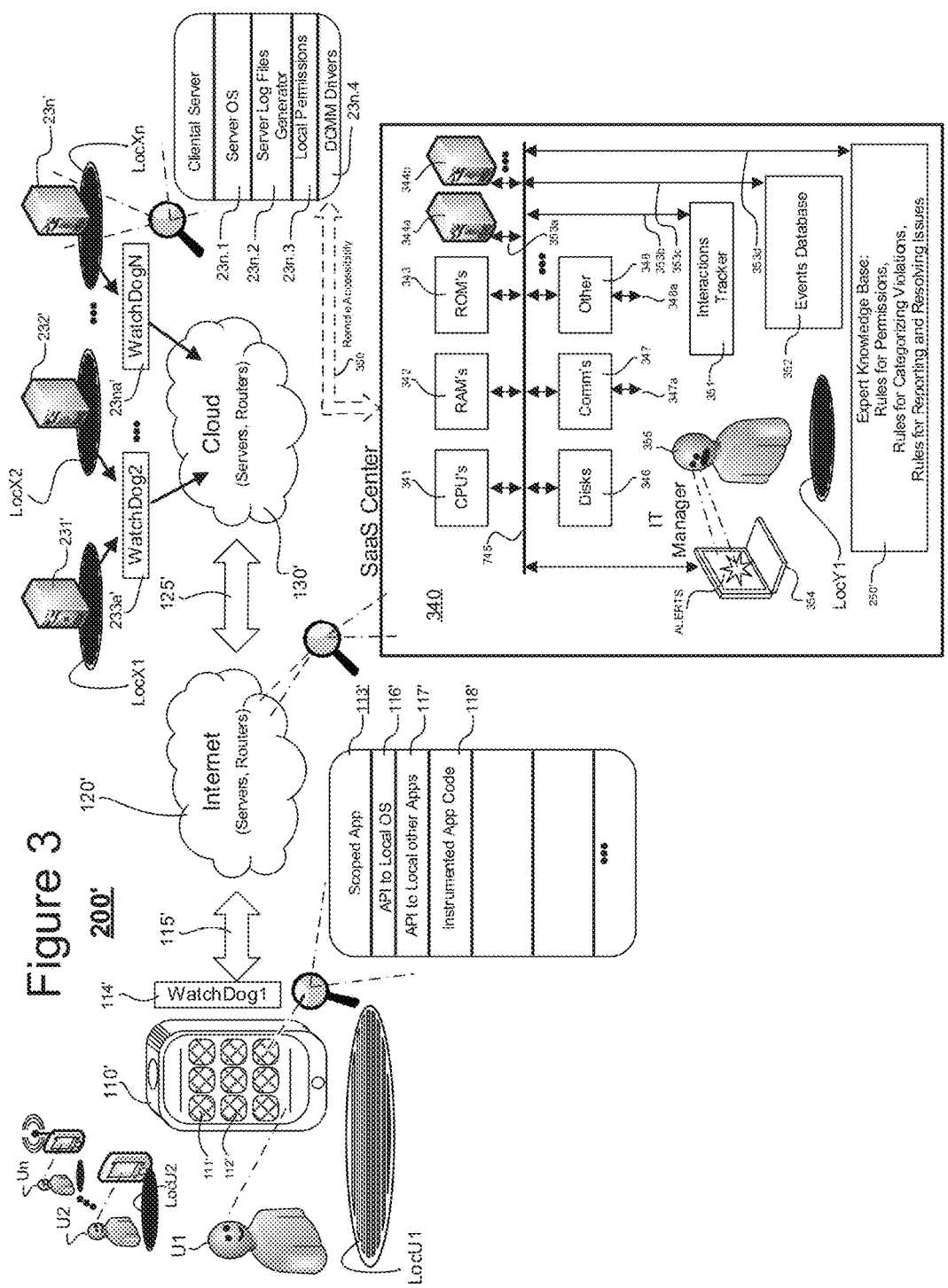

DISCRIMINATING DYNAMIC CONNECTION OF DISCONNECTABLE PERIPHERALS

BACKGROUND

Disconnectably connectable peripheral devices add great flexibility to computer systems because for example, one peripheral device can be easily shared among several computers. A well known such shareable device is the finger-sized USB (Universal Serial Bus) connectable Flash memory device (sometimes referred to as a Jump drive or Thumb drive or Memory stick). Users can easily hot-plug a USB memory stick into a USB socket of a first computer (e.g., desktop, laptop, tablet, etc.) for automated plug and play of on-stick music or execution of an in-stick application program or they can easily move or copy files between their hard drives and the USB memory stick. Users can easily disconnect the memory stick from the first computer, carry it over to a second computer, reconnect the stick into the USB socket of the second computer and again transfer files, play music or execute an in stick application program.

One of the background operations that make quick and easy plug-and-play possible for USB connectable peripherals is a standardized USB hot-plug connection-making protocol. When a USB device is plugged into a USB socket, a USB protocol-compliant program automatically detects the plug-in event and automatically inquires as to the device type and class of the plugged-in peripheral. Examples of device typing classes include device class enumerators such as: LIBUSB_CLASS_MASS_STORAGE (e.g., for flash memory sticks); LIBUSB_CLASS_AUDIO (e.g., for plug-in audio devices); and LIBUSB_CLASS_PRINTER (e.g., for plug-in printers). Once the connection-making procedure determines the device class and other attributes of one or more newly attached USB devices it knows how to deal with each. For example it may automatically load appropriate device interfacing software drivers for each of the self-identifying USB devices. This kind of automated, plug-and-play disconnectable connection making brings great flexibility. However it also opens up security holes.

It is to be understood that this Background section is intended to provide useful introductory information for understanding here disclosed and novel technology. As such, the Background section may include ideas, concepts or recognitions that were not part of what was known or appreciated by those skilled in the pertinent art prior to corresponding invention dates of subject matter disclosed herein.

BRIEF SUMMARY

According to one aspect of the present disclosure, an automated watchdog device is operatively coupled to substantially every USB socket and/or to substantially every other dynamic connection-making mechanism ("DCMM") of an enterprise system where each such DCMM allows for automated dynamic connection of disconnectable peripherals. The automated watchdog device checks a local, and optionally variable, list of permissions and/or a local set of predetermined rules to see what types (if any) of dynamically connectable and disconnectable peripherals (DCP's) are to be allowed access through that socket (or through another form of a localized dynamic connection-making mechanism, e.g., a wireless DCMM) and which are to be denied access. Aside from access denial based on type of DCP (e.g., type=keyboard) and location of the socket (or of another form of a Dynamic Connection-Making Mechanism, a.k.a. "DCMM"), access denial may be based on time of day and/or on other contexts, for example as may be defined by a localized set of connection-making permission rules. In this way, a window of opportunity by way which security may be breached is significantly reduced.

As used here, the term, Dynamic Connection-Making Mechanism; (DCMM) is not limited to just the USB hot-plug mechanism and instead may apply to any dynamic connection-making mechanism, be it wired or wireless whereby a peripheral device can be conveniently coupled to a server or network on a temporary basis and then removed so that after removal, evidence of its presence may no longer be there.

For sake of an introductory example, however, consider a USB flash stick having an onboard, Trojan horse application program which untruthfully enumerates itself to the USB Dynamic Connection-Making Mechanism as being a USB keyboard (sometimes more broadly specified as a physical interface type that is operable by an end-user) rather than being an application program. In that case, the USB connection-making protocol might give the alleged keyboard greater security permissions than would have been given to an untrusted application program. This is one way that security can be breached. The Trojan horse application program can start using its keyboard status for the purpose of mimicking a human user trying to enter a password via a physical keyboard. In accordance with one aspect of the present disclosure, a watchdog device or service is non-removably attached to basically every intruder reachable USB socket and the watchdog device/service limits the locations, times of day and/or other contexts under which a USB plug-in device of a given type (e.g., keyboard) can gain access through that socket. Thus access opportunities via USB sockets are greatly constrained so that malicious users or unsuspecting users infected by a virus cannot mindlessly plug in a security-attacking USB flash stick into any random USB socket and thereby breach system security.

This Brief Summary provides a selected subset of introductory concepts in simplified form where the latter and further ones are described in greater detail in the below Detailed Description section. This Brief Summary is not intended to identify key or essential aspects of the disclosed and claimed subject matter, nor is it intended to be used as an aid in determining the scope of claimed subject matter. The scope of the disclosure is to be determined by considering the disclosure in its entirety.

BRIEF DESCRIPTION OF THE DRAWINGS

FIG. 1A is a schematic diagram of an enterprise wide data processing system including a plurality of servers that might include USB or other forms of dynamic connection making mechanisms (DCMM's).

FIG. 1B is a flow chart depicting one embodiment of dynamic connection and disconnection making.

FIG. 3 is a schematic diagram depicting more details of an enterprise wide system such as that of FIG. 2A.

DETAILED DESCRIPTION

Figure 2A:
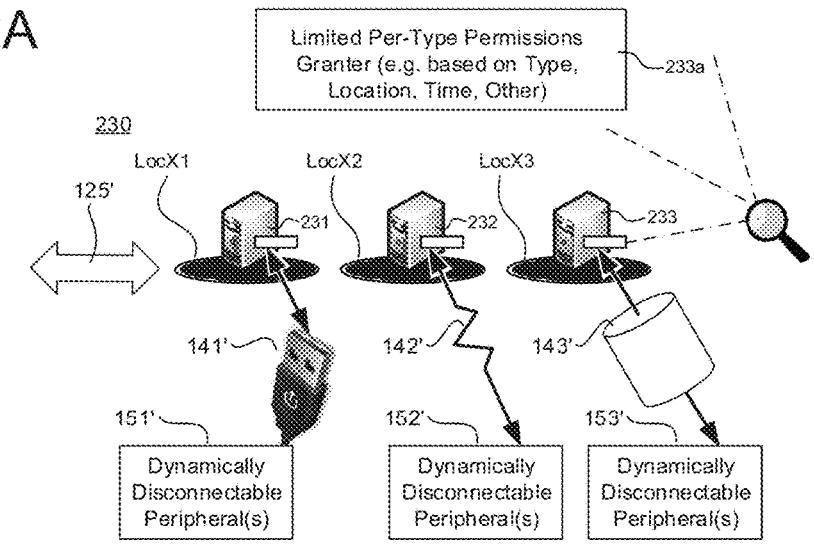
FIG. 2A is a schematic diagram of an enterprise wide data processing system in accordance with the present disclosure where one or more dynamic connect/disconnect watchdog units oversee substantially all Dynamic Connection-Making Mechanisms (DCMM's) so as to thereby limit what types of devices can be dynamically coupled at each location and/or under different contexts.

FIG. 1A is a schematic diagram showing a selected few representative parts of an integrated client-server/internet/cloud system 100 (or more generically, an integrated enterprise system 100) to which the here disclosed technology may be applied. Additional details respecting such systems will be provided later below in conjunction with FIG. 3.

System 100 is a machine system having distributed resources including a variety of differently-located and interconnected data processing and data communication mechanisms such as for example, customer-sited client units (e.g., wireless smartphone 110 at user location LocU1) and differently located enterprise servers (e.g., in-cloud servers 131, 132, . . . 13n (not all shown) having respective siting locations LocX1, LocX2, . . . LocXn). Each client unit (e.g., 110—only one shown but understood to be exemplary of thousands of such clients) is configured to transmit requests for various services to one or more of in-cloud or in-internet enterprise servers such as servers 131, 132 . . . 13n (not all shown). It is to be understood that the client and server units each typically includes a CPU and/or other digital data processing circuitry, memory embedded within and/or ancillary to the data processing circuitry, communication circuitry configured to enable various kinds of data transference including by wired and wireless means and computer code physically encoded in one or more forms of memory including instruction codes configured for causing one or more of the data processing circuits to perform called-for application servicing or system servicing operations. The stored instruction codings may vary from one client machine (e.g., 110) to the next (not shown) for example because they have different operating systems (e.g., Apple iOS™ versus Google Android™) and/or different background programs for producing background event reporting streams (e.g., events such as a switch from WiFi to cellular communication mode due to lost WiFi signal).

It is common practice to provide a variety of Dynamic Connection-Making Mechanisms (DCMM's) at each server location and at various network AP locations (access points) such as, but not limited to, a plurality of USB sockets into which USB plugs (e.g., 141) may be disconnectably connected on a hot-plug basis for thereby creating disconnectable couplings with removable USB compliant peripheral devices (e.g., 151). The provided DCMM's may alternatively or additionally enable the forming of dynamic wireless disconnectable connections (e.g., 142) by way of standardized mechanisms such as Bluetooth™ and Wi-Fi™ whereby radio and/or other wireless technologies are usable for creating disconnectable couplings with corresponding further removable peripheral devices (e.g., 152). Symbol 143 represents more generally any type of dynamically couplable and decouplable interface by way of which corresponding and removable peripheral devices (e.g., 153) may be temporarily and operably coupled to a system access point (e.g., server 133 sited at location LocX3, where the latter can be a remote location not regularly scanned by security personnel). Although FIG. 1A illustrates temporary connection making with networked serves (e.g., 131-133), it is to be understood that temporary connection making with network access points (AP's) such as routers and switchers is also contemplated.

When a large number of Dynamic Connection-Making Mechanisms (DCMM's; e.g., 141, 142, 143) are distributed through a relatively large enterprise system, it can become very easy for a hacker to visit an unguarded site and to then plug-in a small USB peripheral device or other DCMM using peripheral device which then proceeds to slowly try out different passwords or other security breaching techniques for penetrating the system without being easily seen. Thus the flexibility of dynamic connection-making poses risks.

Referring to FIG. 1B, an exemplary process 160 is illustrated by way of which a DCMM using peripheral device can gain access at any unguarded port of an enterprise wide system (e.g., 100 of FIG. 1A). Entry may be made at node 161. Step 162 repeatedly tests for whether a DCMM making of a connection at the location is being attempted. If no, control returns to node 161. If yes, control advances to step 163 in which it is determined what type of connection is being attempted and what connection making protocol should be used (e.g., a standard USB protocol or some other protocol, say FireWire™).

In step 164, corresponding access permissions are created based on a carrying out of the determined connection making protocol. For example, in the case of a USB or the like type of connection making protocol, the external peripheral (e.g., Flash stick) is automatically queried as to what type of device it is. A malicious such peripheral may deceive the protocol by declaring for example that it includes a human-operated keyboard (see options in block 164a) or another such user-interface input device (e.g., mouse, touch pad) whereby the dynamically connectable and disconnectable peripheral (DCP) may mimic a user legitimately using a keyboard or other such user-interface input device for entering commands or otherwise hacking into the system. Later, the alleged keyboard/mouse/touch-pad/etc. may be used on a trial and error basis to enter commands or try to crack passwords such as may be used by system administrators because the system has been fooled into believing that a physical keyboard or other such user-interface input device is present at the dynamic connection-making site. In addition to deceiving the system with respect to a user-interface input device (e.g., mouse, touch pad) being present at the location, the external peripheral (e.g., Flash stick) may attempt to mimic being a user-interface output device (e.g., printer, display screen) whereby it deceives the system into supplying it with output information meant for an authorized human user.

In subsequent step 165, the dynamically made connection is operated in accordance with the created permissions (e.g., including permissions for normal operation of an alleged human-operated keyboard). Step 166 tests for whether a disconnection of the DCMM-attached peripheral (e.g., Flash stick, keyboard or other) is being attempted. If no, control returns to step 165. If yes, control advances to step 168 where the previously granted permissions are deleted. (Although not explicitly shown, in one embodiment the deletion or cancellation of the granted permissions includes disabling one or more software port drivers—see briefly 13n.4 of FIG. 3—which were used to interface with the declared type of DCMM-attached peripheral.) Control then returns to node 161 where the process can repeat.

Referring to FIG. 2A, shown is a representative portion of an enterprise wide system 200 configured in accordance with the present disclosure. Like reference numerals are used in FIG. 2A for like portions already described with respect to FIG. 1A. Although just one DCMM-attachment watchdog unit 233a is shown in enlarged form as being interposed between internal components of server 233 and general DCMM mechanism 143', it is to be understood that such a DCMM-attachment watchdog unit is provided to be operatively interposed between internal components of substantially all the other servers (e.g., 231' at location LocX1, 232' at location LocX2, etc.) of the enterprise wide system 200 so as to reduce the likelihood of deceit-based access being granted anywhere throughout the system 200 to a DCMM-attachable peripheral (e.g., 151', 152', 153', etc.). More specifically and as indicated in block 233*a*, the access permissions granted to each locally coupled, DCMM-attachable peripheral (e.g., 151') is limited on a per-type of device basis as well as on the basis of the connection location and optionally on the basis of the time of connection making or continuation of the connection and/or on the basis of other parameters that define context at the respective location. Permission granting may be based on IF-THEN-ELSE types of expert permission rules stored in a knowledge base storage unit (e.g., 250' of FIG. 3). Thus, essentially all intruder reachable Dynamic Connection-Making Mechanisms (DCMM's) of the enterprise system 200 may be guarded round the clock by such watchdog units 233*a* (or equivalent software services). It is to be understood that the present disclosure contemplates use of the watchdog units (e.g., 233*a*) at less than all of the DCMM's of a system such as 200. Even the inclusion of just one such watchdog unit (e.g., 233*a*) can improve system security.

Figure 2B:
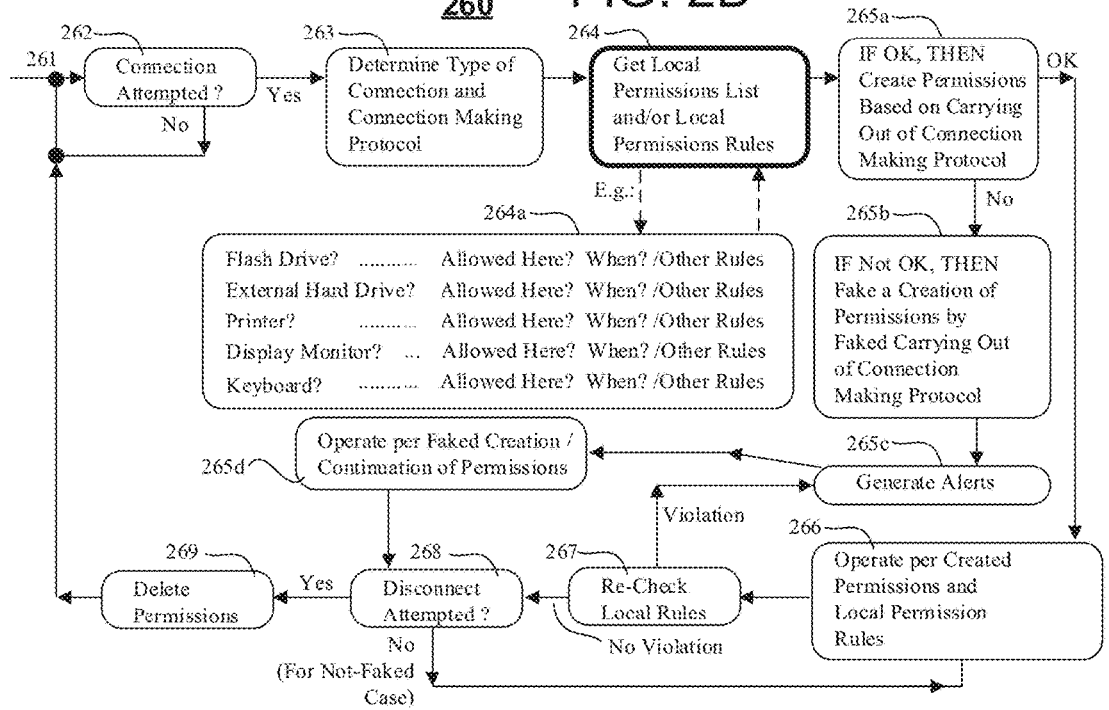
FIG. 2B is a flow chart describing one embodiment of a process for limiting access through DCMM's.

FIG. 2B illustrates an exemplary embodiment of a process 260 that may be automatically carried out at at least one, but more preferably at substantially every DCMM-attachment location of the enterprise system 200 in order to thereby prevent or reduce the risk of improper types DCMM-attachable peripherals (e.g., 151) being granted connection permission at locations and/or during time spans and/or under contextual circumstances for which such connections would warrant suspicion and denial of access.

As in the case of FIG. 1B, entry may be made at node 261. In step 262, testing for a connection attempt event is repeatedly carried out. If a connection attempt event is detected, then in subsequent step 263 a determination is made as to the type of connection being attempted and the identification of the corresponding connection making protocol.

Unlike what happens in process 160 of FIG. 1B, the connection making protocol is not immediately carried out in process 260. Instead, in step 264 reference is made to a permissions list and/or to a set of permission rules that are predetermined to be applicable to the local Dynamic Connection-Making Mechanism (DCMM). It is to be understood that in one embodiment, the local permissions list and/or to a set of permission rules are modifiable from a remote administrative site by way of appropriate secured modification channels so that the list and/or rules can be modified on the fly. Block 264*a* provides a nonexhaustive example of what such a permissions list may contain. In its simplest form, the local permissions list 264*a* may indicate whether each enumerated type of dynamically connectable device is permitted or not permitted to be dynamically connected at the present location. Therefore, as an example, if the DCMM-attachable peripheral (e.g., 151) declares itself as including a keyboard but attachment of keyboards is unexpected at the given location, then the list 264*a* would indicate that the keyboard type is disallowed at the current location. The connection attempt would then be denied (or would be effectively denied although appearing to have been accepted as explained below with respect to block 265*b*).

A more complex form of permissions granting list (e.g., 264*a*) may include other or further forms of qualifiers directed not only to where, but optionally to when, who is behind it, how and under what further contextual circumstances the connection attempt is being made. More specifically, if a service technician is scheduled to visit a remote site (e.g., location LocX2) at a known time and is instructed to utilize a known type of wireless temporary connection 142', then the local permissions list 264*a* may be temporarily modified by a remote control center (see briefly 340 of FIG. 3) to allow for such a connection at the scheduled time and by way of the instructed connection method. If the identity of the service technician is known, additional permission rules may be activated to force the technician to type in a predetermined password before permission for the requested dynamic connection (e.g., 142') is granted. Yet further permission rules may require that the accessed server (e.g., 232) be in a predetermined operating state (e.g., service software is already preloaded) before connection permission is granted. Thus, dynamic connection through the Dynamic Connection-Making Mechanisms (DCMM's) of remote sites may be tightly guarded so that hackers cannot easily exploit such connection-making mechanisms at other times when no one else is around to watch.

If all the permission granting requirements are met, then in step 265*a* the corresponding permissions are created using the determined connection making protocol. Control then advances to a subsequent step 266. In step 266, operation of the connected DCP peripheral (e.g., USB Flash stick) continues in accordance with the created permissions while repeatedly checking (in step 267) if the local rules or permission list has been modified to thus create a violation condition. If no violation, then in step 268 there is a test for a disconnect attempt event. If no disconnect attempt, control returns to step 266 four continued operation under the created permissions. On the other hand, if a violation is detected in testing step 267 then control passes to an alerts generating step 265*c*, where after control may be optionally passed to a faked connection-continuing step 265*d* whose purpose is now explained.

Steps 265*c* and 265*d* are part of a sequence that typically also includes step 265*b*. In a case following step 264 where a connection-making attempt violates the local permissions list and/or the local permission rules (e.g., as exemplified in 264*a*) then appropriate alerts will be generated and sent to appropriate system administrators in step 265*c*. However, under one option, it might be desirable to let the intrusion-attempting person or intrusion-attempting device to come to believe that the attempted making of the connection was successful so that, for example the intruder does not escape too soon and/or the methods deployed by the intruder can be observed for the purpose of improving security measures. Accordingly in step 265*b*, the making of a connection in accordance with the identified protocol is faked and isolated interactions are carried out with the peripheral device without disturbing true system parameters (e.g., financial accounts, password settings, administrator settings etc.). The isolated interactions are recorded for later analysis. In other words, in response to determination that the attempted connection is not in accordance with local permissions list and/or permission rules, the process includes not allowing an operatively effective connection to be actually made and instead faking the connection so that the potentially intruding dynamically connectable and disconnectable peripheral (DCP) and/or its user are fooled into believing they successfully established an operatively effective connection (e.g., one that can fetch and/or modify critical data parameters such as financial account balances, user passwords, administrative setting and so on). At the same time in step 265*c*, appropriate alerts are transmitted to system administrators identifying the location and other attributes of the rules violating, attempted connection. Meanwhile in step 265*d*, the faked connection and its associated but isolated interactions are continued until the rules-violating intruder attempts a disconnect at step 268. If yes, control passes to step 269 where the real or faked permissions are deleted and control returns to entry node 261. If no disconnect is attempted for the continuing faked interaction of step 265*d* then the latter continues with repeated testing for a disconnect attempt and with optional recording of the transactions attempted by the rules-violating intruder.

FIG. 1A illustrated a small portion of an enterprise wide system. Next referring to FIG. 3, a more detailed description is provided for an enterprise system 200' having permission watchdogs installed for at least some and preferably substantially all Dynamic Connection-Making Mechanisms (DCMM's) within the system.

More specifically, the illustrated integrated client-server/internet/cloud system 200' (or more generically, an integrated multi-device system 200') in which the here disclosed technology is applied may also be referred to as an SaaS serviced, distributed resources, machine system in which there are provided a variety of differently-located data processing and data communication mechanisms including for example, customer-sited units (e.g., wireless smartphone 110') configured to allow end-users thereof (e.g., U1) to request from respective end-user occupied locations (e.g., LocU1) services from differently located enterprise hosts (e.g., in-cloud servers 231', 232', . . . 23*n*' having respective siting locations LocX1, LocX2, . . . LocXn). There is further provided an enterprise resources monitoring and managing center (SaaS 340) tasked with the job of monitoring all mission-vital points within the system 200' and with the job of managing corresponding hardware and software portions so that pre-specified business and security goals of 'cliental' of the SaaS can be realized without any undue interruptions in service and achievement of those goals.

It is to be understood that the illustrated system 200' is merely exemplary. As indicated, it comprises at least a few, but more typically a very large number (e.g., thousands) of end-user devices 110' (only a few shown in the form of wireless smartphones but understood to represent many similarly situated mobile and/or stationary client machines including the smartphone wireless client kinds and cable-connected desktop kinds). These end-user devices 110' are capable of originating service requests which are ultimately forwarded to service-providing host machines (e.g., in-cloud servers 231', 232', . . . 23*n*') within a cloud environment. Results from the service-providing host machines are thereafter typically returned to the end-user devices 110' and displayed or otherwise communicated to the end-users (e.g., U1, U2, . . . , Un). For example, if a business goal of the enterprise that of online selling of hard covered books, the end-user (U1) may have installed on his/her smartphone (110') a software application ("app") that automatically requests from the enterprise, a list of new books that may be of current interest to the end-user (U1). In response to the request, enterprise software and hardware modules automatically identify the user, pull up a user profile (e.g., including user password and financial details), search for matching new books, and then within a very short time (e.g., a minute or less), communicate back the list for almost instant playout on the end-user's device 110'. The end-user may then click on one of the offered selections and instantly purchase the book while having his online account charged. The end-user device 110' may be a DCP device which dynamically connects with the network by way of a Wi-Fi™ connection, Bluetooth™ connection or the like. It is possible that an intruder or intruder device may attempt to dynamically connect into the system by way of the same Dynamic Connection-Making Mechanisms (DCMM's) that legitimate end-users use. In accordance with the present disclosure, watchdog units and/or services such as 114' are provided at the end user DCMM's for restricting the device types that may connect there when connecting to the enterprise system. Further watchdog units and/or services such as 233*a*' and 23*na*' are provided at other DCMM's of the enterprise system for restricting the device types that may connect there when connecting to the enterprise system. Thus system security may be improved by selectively restricting the peripheral types that are connectable via respective Dynamic Connection-Making Mechanisms (DCMM's).

Aside from the end-user devices (e.g., 110') and the cloud servers (e.g., 231', 232', . . . , 23*n*') the system 200' comprises: one or more wired and/or wireless communication fabrics 115' (only one shown in the form of a wireless bidirectional interconnect) coupling the end-user client(s) 110' to networked servers 120' (not explicitly shown, and can be part of an Intranet or the Internet) where the latter may operatively couple by way of further wired and/or wireless communication fabrics 125' (not explicitly shown) to further networked servers 130' (e.g., 231, 232, . . . 23*n*').

The second set of networked servers 130 is depicted as a "cloud" 130' for the purpose of indicating a nebulous and constantly shifting, evolving set of hardware, firmware and software resources. In-the-cloud resources are typically used by large scale enterprise operations for the purpose of keeping mission critical tasks going without undue interruptions. As those skilled in the art of cloud computing appreciate, the "cloud" 130' may be implemented as reconfigurable virtual servers and virtual software modules implemented across a relatively seamless web of physical servers, storage units (including flash BIOS units and optical and/or magnetic storage units), communication units and the like such that point failure of specific units within the physical layer are overcome by shifting the supported virtual resources to spare other support areas in the physical layer. Because of sheer size and also the constantly shifting and self-reconfiguring fabric of resources, it can be very difficult to monitor and manage all the hardware and software resources of the system 200'. The latter task is often delegated to an SaaS services provider (e.g., 340). Although data processing and communication resources can be virtualized in the cloud, it nonetheless has a physically real support layer composed of servers, routers, switches and so forth that typically have Dynamic Connection-Making Mechanisms (DCMM's) such as USB ports and WiFi™ and/or other wired and wireless temporary connection-making resources. As illustrated in FIG. 3, one or more watchdog circuits and/or software services such as 233*a*' and 23*na*' are preferably interposed between the physical DCMM's and internals of the respective servers (or network AP's—not shown) for reducing risk of dynamic connection-making by unexpected types of dynamically connectable and disconnectable peripherals (DCP's) optionally at unexpected times and/or under other forms of unexpected contexts.

Still referring to FIG. 3, a further walk through the illustrated system 200' is provided here so that readers may appreciate the bird's eye lay of the land, so to speak. Item 111' represents a first user-activatable software application (first mobile app) that may be launched from within the exemplary mobile client 110' (e.g., a smartphone, but could instead be a tablet, a laptop, a wearable computing device;

i.e. smartwatch or other). Item 112' represents a second such user-activatable software application (second mobile app) and generally there are many more. Each end-user installed application (e.g., 111', 112') can come in the form of non-transiently recorded digital code (i.e. object code or source code) that is defined and stored in a memory for instructing a target class of data processing units to perform in accordance with end-user-side defined application programs ('mobile apps' for short) as well as to cooperate with server side applications implemented on the other side of communications links 115' and/or 125'. Each app (e.g., 111', 112') may come from a different business or other enterprise (e.g., book selling business—not shown) and may require the assistance of various and different online resources (e.g., Internet, Intranet and/or cloud computing resources). Generally, each enterprise is responsible for maintaining in good operating order its portions of the (e.g., Internet, Intranet and/or cloud computing resources). Each business enterprise may hire or otherwise employ a SaaS provider 340 to manage all of its online resources. Plural business or other enterprises can pool parts of their resources into a common core of resources that are watched over by a single SaaS provider 340 so as to reduce operating costs.

In one embodiment, one or more of the mobile apps are instrumented so that in the background they provide useful quality control data that can be picked up by the SaaS provider 340 for monitoring performance, where pickup of the quality control data may occur at different locations (e.g., LocX1, LocX2, . . . , LocXn) throughout the enterprise system 200'. An example of an instrumented or 'scoped app' is depicted at 113'. It includes an API interface 116' to the local operating system (e.g., Apple iOS™ or Android™). It may include further API's 117' to other local apps. It may further include instrumented execution code 118' where the instrumented part causes various pieces of meta-data to be embedded in the back and forth communication packets of the device 110'. Examples of such embedded meta-data may include indications of time of service-request, complexity/size of service-request, location where service-request was launched from, type of local OS, ID of cellular carrier and so forth. This embedded meta-data is picked up by backend enterprise servers and by monitoring agents thereof (e.g., embedded in servers such as 23n' but not shown). The picked up meta-data is used for determining system performance (for example, how long did it take from time of end-user request to complete the requested service?). In more detail, some of the embedded meta-data may be targeted for use by a SaaS backend agent such as indicated at 354/355. In accordance with one aspect of the present disclosure, the SaaS backend agent 354/355 may monitor for local permissions violations as detected by the various watchdog units/services (e.g., Watchdog1, Watchdog2, . . . WatchdogN) distributed throughout the system. The local permission lists and/or rules may be locally stored in the respective watchdog units and/or in the local servers (or network AP's) as indicated for example at 23n.3. Dynamic Connection-Making Mechanism software and/or hardware drivers (DCMM drivers) may be locally stored in the respective watchdog units and/or in the local servers (or network AP's) as indicated for example at 23n.4 where the watchdog units/services are provided with the ability to disable the drivers or divert their outputs when permission violations are detected (e.g., as in steps 264-265a-265d of FIG. 2B).

Typically, large systems such as 200' are subdivided into management-defined "sections". The size and resources inventory of each section is left to mangers of the system, but generally each section; where 340 is used here as an example of a system section, includes a limited number of intercoupled, "local" resources such as one or more local data processing units (e.g., CPU's 341), one or more local data storage units (e.g., RAM's 342, ROM's 343, Disks 346), one or more local data communication units (e.g., COMM units 347), and a local backbone (e.g., local bus 345) that operatively couples them together as well as optionally coupling them to yet further ones of local resources 348. The other local resources 348 may include, but are not limited to, specialized high speed graphics processing units (GPU's, not shown), specialized high speed digital signal processing units (DSPU's, not shown), custom programmable logic units (e.g., FPGA's, not shown), analog-to-digital interface units (A/D/A units, not shown), parallel data processing units (e.g., SIMD's, MIMD's, not shown), local user interface terminals (e.g., 354) and so on. If desired, watchdog units/services may be installed for a corresponding one or more Dynamic Connection-Making Mechanisms (DCMM's) of the SaaS center 340 and permission violations even of these local DCMM's may be tracked by an interactions tracker 351.

FIG. 1A illustrated a small portion of an enterprise wide system. Next referring to FIG. 3, a more detailed description is provided for an enterprise system 200' having permission watchdogs installed for at least some and preferably substantially all Dynamic Connection-Making Mechanisms (DCMM's) within the system.

More specifically, the illustrated integrated client-server/internet/cloud system 200' (or more generically, an integrated multi-device system 200') in which the here disclosed technology is applied may also be referred to as an SaaS serviced, distributed resources, machine system in which there are provided a variety of differently-located data processing and data communication mechanisms including for example, customer-sited units (e.g., wireless smartphone 110') configured to allow end-users thereof (e.g., U1) to request from respective end-user occupied locations (e.g., LocU1) services from differently located enterprise hosts (e.g., in-cloud servers 231', 232', . . . 23n' having respective siting locations LocX1, LocX2, . . . LocXn). There is further provided an enterprise resources monitoring and managing center (SaaS 340) tasked with the job of monitoring all mission-vital points within the system 200' and with the job of managing corresponding hardware and software portions so that pre-specified business and security goals of 'cliental' of the SaaS can be realized without any undue interruptions in service and achievement of those goals.

It is to be understood that the illustrated system 200' is merely exemplary. As indicated, it comprises at least a few, but more typically a very large number (e.g., thousands) of end-user devices 110' (only a few shown in the form of wireless smartphones but understood to represent many similarly situated mobile and/or stationary client machines including the smartphone wireless client kinds and cable-connected desktop kinds). These end-user devices 110' are capable of originating service requests which are ultimately forwarded to service-providing host machines (e.g., in-cloud servers 231', 232', . . . 23n') within a cloud environment. Results from the service-providing host machines are thereafter typically returned to the end-user devices 110' and displayed or otherwise communicated to the end-users (e.g., U1, U2, . . . , Un). For example, if a business goal of the enterprise that of online selling of hard covered books, the end-user (U1) may have installed on his/her smartphone (110') a software application ("app") that automatically requests from the enterprise, a list of new books that may be of current interest to the end-user (U1). In response to the request, enterprise software and hardware modules automatically identify the user, pull up a user profile (e.g., including user password and financial details), search for matching new books, and then within a very short time (e.g., a minute or less), communicate back the list for almost instant playout on the end-user's device 110'. The end-user may then click on one of the offered selections and instantly purchase the book while having his online account charged. The end-user device 110' may be a DCP device which dynamically connects with the network by way of a Wi-Fi™ connection, Bluetooth™ connection or the like. It is possible that an intruder or intruder device may attempt to dynamically connect into the system by way of the same Dynamic Connection-Making Mechanisms (DCMM's) that legitimate end-users use. In accordance with the present disclosure, watchdog units and/or services such as 114' are provided at the end user DCMM's for restricting the device types that may connect there when connecting to the enterprise system. Further watchdog units and/or services such as 233a' and 23na' are provided at other DCMM's of the enterprise system for restricting the device types that may connect there when connecting to the enterprise system. Thus system security may be improved by selectively restricting the peripheral types that are connectable via respective Dynamic Connection-Making Mechanisms (DCMM's).

Aside from the end-user devices (e.g., 110') and the cloud servers (e.g., 231', 232', . . . , 23n') the system 200' comprises: one or more wired and/or wireless communication fabrics 115' (only one shown in the form of a wireless bidirectional interconnect) coupling the end-user client(s) 110' to networked servers 120' (not explicitly shown, and can be part of an Intranet or the Internet) where the latter may operatively couple by way of further wired and/or wireless communication fabrics 125' (not explicitly shown) to further networked servers 130' (e.g., 231, 232, . . . 23n').

The second set of networked servers 130 is depicted as a "cloud" 130' for the purpose of indicating a nebulous and constantly shifting, evolving set of hardware, firmware and software resources. In-the-cloud resources are typically used by large scale enterprise operations for the purpose of keeping mission critical tasks going without undue interruptions. As those skilled in the art of cloud computing appreciate, the "cloud" 130' may be implemented as reconfigurable virtual servers and virtual software modules implemented across a relatively seamless web of physical servers, storage units (including flash BIOS units and optical and/or magnetic storage units), communication units and the like such that point failure of specific units within the physical layer are overcome by shifting the supported virtual resources to spare other support areas in the physical layer. Because of sheer size and also the constantly shifting and self-reconfiguring fabric of resources, it can be very difficult to monitor and manage all the hardware and software resources of the system 200'. The latter task is often delegated to an SaaS services provider (e.g., 340). Although data processing and communication resources can be virtualized in the cloud, it nonetheless has a physically real support layer composed of servers, routers, switches and so forth that typically have Dynamic Connection-Making Mechanisms (DCMM's) such as USB ports and WiFi™ and/or other wired and wireless temporary connection-making resources. As illustrated in FIG. 3, one or more watchdog circuits and/or software services such as 233a' and 23na' are preferably interposed between the physical DCMM's and internals of the respective servers (or network AP's—not shown) for reducing risk of dynamic connection-making by unexpected types of dynamically connectable and disconnectable peripherals (DCP's) optionally at unexpected times and/or under other forms of unexpected contexts.

Still referring to FIG. 3, a further walk through the illustrated system 200' is provided here so that readers may appreciate the bird's eye lay of the land, so to speak. Item 111' represents a first user-activatable software application (first mobile app) that may be launched from within the exemplary mobile client 110' (e.g., a smartphone, but could instead be a tablet, a laptop, a wearable computing device; i.e. smartwatch or other). Item 112' represents a second such user-activatable software application (second mobile app) and generally there are many more. Each end-user installed application (e.g., 111', 112') can come in the form of non-transiently recorded digital code (i.e. object code or source code) that is defined and stored in a memory for instructing a target class of data processing units to perform in accordance with end-user-side defined application programs ('mobile apps' for short) as well as to cooperate with server side applications implemented on the other side of communications links 115' and/or 125'. Each app (e.g., 111', 112') may come from a different business or other enterprise (e.g., book selling business—not shown) and may require the assistance of various and different online resources (e.g., Internet, Intranet and/or cloud computing resources). Generally, each enterprise is responsible for maintaining in good operating order its portions of the (e.g., Internet, Intranet and/or cloud computing resources). Each business enterprise may hire or otherwise employ a SaaS provider 340 to manage all of its online resources. Plural business or other enterprises can pool parts of their resources into a common core of resources that are watched over by a single SaaS provider 340 so as to reduce operating costs.

In one embodiment, one or more of the mobile apps are instrumented so that in the background they provide useful quality control data that can be picked up by the SaaS provider 340 for monitoring performance, where pickup of the quality control data may occur at different locations (e.g., LocX1, LocX2, . . . , LocXn) throughout the enterprise system 200'. An example of an instrumented or 'scoped app' is depicted at 113'. It includes an API interface 116' to the local operating system (e.g., Apple iOS™ or Android™). It may include further API's 117' to other local apps. It may further include instrumented execution code 118' where the instrumented part causes various pieces of meta-data to be embedded in the back and forth communication packets of the device 110'. Examples of such embedded meta-data may include indications of time of service-request, complexity/ size of service-request, location where service-request was launched from, type of local OS, ID of cellular carrier and so forth. This embedded meta-data is picked up by backend enterprise servers and by monitoring agents thereof (e.g., embedded in servers such as 23n' but not shown). The picked up meta-data is used for determining system performance (for example, how long did it take from time of end-user request to complete the requested service?). In more detail, some of the embedded meta-data may be targeted for use by a SaaS backend agent such as indicated at 354/355. In accordance with one aspect of the present disclosure, the SaaS backend agent 354/355 may monitor for local permissions violations as detected by the various watchdog units/services (e.g., Watchdog1, Watchdog2, . . . WatchdogN) distributed throughout the system. The local permission lists and/or rules may be locally stored in the respective watchdog units and/or in the local servers (or network AP's) as indicated for example at 23n.3. Dynamic Connection-Making Mechanism software and/or hardware drivers (DCMM drivers) may be locally stored in the respective watchdog units and/or in the local servers (or network AP's) as indicated for example at 23n.4 where the watchdog units/services are provided with the ability to disable the drivers or divert their outputs when permission violations are detected (e.g., as in steps 264-265a-265d of FIG. 2B).

Typically, large systems such as 200' are subdivided into management-defined "sections". The size and resources inventory of each section is left to mangers of the system, but generally each section; where 340 is used here as an example of a system section, includes a limited number of intercoupled, "local" resources such as one or more local data processing units (e.g., CPU's 341), one or more local data storage units (e.g., RAM's 342, ROM's 343, Disks 346), one or more local data communication units (e.g., COMM units 347), and a local backbone (e.g., local bus 345) that operatively couples them together as well as optionally coupling them to yet further ones of local resources 348. The other local resources 348 may include, but are not limited to, specialized high speed graphics processing units (GPU's, not shown), specialized high speed digital signal processing units (DSPU's, not shown), custom programmable logic units (e.g., FPGA's, not shown), analog-to-digital interface units (A/D/A units, not shown), parallel data processing units (e.g., SIMD's, MIMD's, not shown), local user interface terminals (e.g., 354) and so on. If desired, watchdog units/services may be installed for a corresponding one or more Dynamic Connection-Making Mechanisms (DCMM's) of the SaaS center 340 and permission violations even of these local DCMM's may be tracked by an interactions tracker 351.

It is to be understood that various ones of the merely exemplary and illustrated, "local" resource units (e.g., 341-348) may include or may be differentiated into more refined kinds. For example, the local CPU's (only one shown as 341) may include single core, multicore and integrated-with-GPU kinds. The local storage units (e.g., 342, 343, 346) may include high speed SRAM, DRAM kinds as well as configured for reprogrammable, nonvolatile solid state data storage (SSD) and/or magnetic and/or other phase change kinds. The local communication-implementing units (only one shown as 347) may operatively couple to various external data communicating links such as serial, parallel, optical, wired or wireless kinds typically operating in accordance with various ones of predetermined communication protocols (e.g., internet transfer protocols, TCP/IP). Similarly, the other local resources (only one shown as 348) may operatively couple to various external electromagnetic or other linkages 348a and typically operate in accordance with various ones of predetermined operating protocols. Additionally, various kinds of local software and/or firmware (including that of watchdog units/services described herein and of the violation monitoring portions described herein) may be operatively installed in one or more of the local storage units (e.g., 342, 343, 346) for execution by the local data processing units (e.g., 341) and for operative interaction with one another. The various kinds of local software and/or firmware may include different operating systems (OS's), various security features (e.g., firewalls, DCMM watchdog units/services), different networking programs (e.g., web browsers), different application programs (e.g., word processing, emailing, spreadsheet, databases, etc.) and so on. A further example of such locally installed software and/or firmware units is shown in the magnification for cloud server 23n', where that server 23n' includes a respective server OS 23n.1 operatively installed therein and respective server security fences (e.g., firewalls) operatively installed therein. The locally installed software and/or firmware units my further include a server events log file generator 23n.2 which produces event logs including those which record interactions attempted by permission violating, dynamically connectable and disconnectable peripherals (DCP's) such as hot-plugged in USB devices. Not explicitly shown but also operatively installed in a behind-the-security-fences area of the server 23n is an operative browser (e.g., a web browser) that is configured to cooperatively interact with the local OS 23n.1 and with local network communication resources (not shown, see instead 347 of section 340). In one class of embodiments, the installed browser is provided with an ability to access hardware and software resources outside of the normal browser "sandbox" so that the browser, if appropriately instrumented, can provide remote monitoring and management (350) of the behaviors of local hardware and software resources of the server 23n, including providing access to its generated event log files 23n.2, to its local permission lists and/or rules 23n.3 and its local DCMM drivers 23n.4 for monitoring and/or modifying purposes.

FIG. 1A illustrated a small portion of an enterprise wide system. Next referring to FIG. 3, a more detailed description is provided for an enterprise system 200' having permission watchdogs installed for at least some and preferably substantially all Dynamic Connection-Making Mechanisms (DCMM's) within the system.

More specifically, the illustrated integrated client-server/internet/cloud system 200' (or more generically, an integrated multi-device system 200') in which the here disclosed technology is applied may also be referred to as an SaaS serviced, distributed resources, machine system in which there are provided a variety of differently-located data processing and data communication mechanisms including for example, customer-sited units (e.g., wireless smartphone 110') configured to allow end-users thereof (e.g., U1) to request from respective end-user occupied locations (e.g., LocU1) services from differently located enterprise hosts (e.g., in-cloud servers 231', 232', . . . 23n' having respective siting locations LocX1, LocX2, . . . LocXn). There is further provided an enterprise resources monitoring and managing center (SaaS 340) tasked with the job of monitoring all mission-vital points within the system 200' and with the job of managing corresponding hardware and software portions so that pre-specified business and security goals of 'cliental' of the SaaS can be realized without any undue interruptions in service and achievement of those goals.

It is to be understood that the illustrated system 200' is merely exemplary. As indicated, it comprises at least a few, but more typically a very large number (e.g., thousands) of end-user devices 110' (only a few shown in the form of wireless smartphones but understood to represent many similarly situated mobile and/or stationary client machines including the smartphone wireless client kinds and cable-connected desktop kinds). These end-user devices 110' are capable of originating service requests which are ultimately forwarded to service-providing host machines (e.g., in-cloud servers 231', 232', . . . 23n') within a cloud environment. Results from the service-providing host machines are thereafter typically returned to the end-user devices 110' and displayed or otherwise communicated to the end-users (e.g., U1, U2, . . . , Un). For example, if a business goal of the enterprise that of online selling of hard covered books, the end-user (U1) may have installed on his/her smartphone (110') a software application ("app") that automatically requests from the enterprise, a list of new books that may be of current interest to the end-user (U1). In response to the request, enterprise software and hardware modules automatically identify the user, pull up a user profile (e.g., including user password and financial details), search for matching new books, and then within a very short time (e.g., a minute or less), communicate back the list for almost instant playout on the end-user's device 110'. The end-user may then click on one of the offered selections and instantly purchase the book while having his online account charged. The end-user device 110' may be a DCP device which dynamically connects with the network by way of a Wi-Fi™ connection, Bluetooth™ connection or the like. It is possible that an intruder or intruder device may attempt to dynamically connect into the system by way of the same Dynamic Connection-Making Mechanisms (DCMM's) that legitimate end-users use. In accordance with the present disclosure, watchdog units and/or services such as 114' are provided at the end user DCMM's for restricting the device types that may connect there when connecting to the enterprise system. Further watchdog units and/or services such as 233a' and 23na' are provided at other DCMM's of the enterprise system for restricting the device types that may connect there when connecting to the enterprise system. Thus system security may be improved by selectively restricting the peripheral types that are connectable via respective Dynamic Connection-Making Mechanisms (DCMM's).

Aside from the end-user devices (e.g., 110') and the cloud servers (e.g., 231', 232', . . . , 23n') the system 200' comprises: one or more wired and/or wireless communication fabrics 115' (only one shown in the form of a wireless bidirectional interconnect) coupling the end-user client(s) 110' to networked servers 120' (not explicitly shown, and can be part of an Intranet or the Internet) where the latter may operatively couple by way of further wired and/or wireless communication fabrics 125' (not explicitly shown) to further networked servers 130' (e.g., 231, 232, . . . 23n').

The second set of networked servers 130 is depicted as a "cloud" 130' for the purpose of indicating a nebulous and constantly shifting, evolving set of hardware, firmware and software resources. In-the-cloud resources are typically used by large scale enterprise operations for the purpose of keeping mission critical tasks going without undue interruptions. As those skilled in the art of cloud computing appreciate, the "cloud" 130' may be implemented as reconfigurable virtual servers and virtual software modules implemented across a relatively seamless web of physical servers, storage units (including flash BIOS units and optical and/or magnetic storage units), communication units and the like such that point failure of specific units within the physical layer are overcome by shifting the supported virtual resources to spare other support areas in the physical layer. Because of sheer size and also the constantly shifting and self-reconfiguring fabric of resources, it can be very difficult to monitor and manage all the hardware and software resources of the system 200'. The latter task is often delegated to an SaaS services provider (e.g., 340). Although data processing and communication resources can be virtualized in the cloud, it nonetheless has a physically real support layer composed of servers, routers, switches and so forth that typically have Dynamic Connection-Making Mechanisms (DCMM's) such as USB ports and WiFi™ and/or other wired and wireless temporary connection-making resources. As illustrated in FIG. 3, one or more watchdog circuits and/or software services such as 233a' and 23na' are preferably interposed between the physical DCMM's and internals of the respective servers (or network AP's—not shown) for reducing risk of dynamic connection-making by unexpected types of dynamically connectable and disconnectable peripherals (DCP's) optionally at unexpected times and/or under other forms of unexpected contexts.

Still referring to FIG. 3, a further walk through the illustrated system 200' is provided here so that readers may appreciate the bird's eye lay of the land, so to speak. Item 111' represents a first user-activatable software application (first mobile app) that may be launched from within the exemplary mobile client 110' (e.g., a smartphone, but could instead be a tablet, a laptop, a wearable computing device; i.e. smartwatch or other). Item 112' represents a second such user-activatable software application (second mobile app) and generally there are many more. Each end-user installed application (e.g., 111', 112') can come in the form of non-transiently recorded digital code (i.e. object code or source code) that is defined and stored in a memory for instructing a target class of data processing units to perform in accordance with end-user-side defined application programs ('mobile apps' for short) as well as to cooperate with server side applications implemented on the other side of communications links 115' and/or 125'. Each app (e.g., 111', 112') may come from a different business or other enterprise (e.g., book selling business—not shown) and may require the assistance of various and different online resources (e.g., Internet, Intranet and/or cloud computing resources). Generally, each enterprise is responsible for maintaining in good operating order its portions of the (e.g., Internet, Intranet and/or cloud computing resources). Each business enterprise may hire or otherwise employ a SaaS provider 340 to manage all of its online resources. Plural business or other enterprises can pool parts of their resources into a common core of resources that are watched over by a single SaaS provider 340 so as to reduce operating costs.

In one embodiment, one or more of the mobile apps are instrumented so that in the background they provide useful quality control data that can be picked up by the SaaS provider 340 for monitoring performance, where pickup of the quality control data may occur at different locations (e.g., LocX1, LocX2, . . . , LocXn) throughout the enterprise system 200'. An example of an instrumented or 'scoped app' is depicted at 113'. It includes an API interface 116' to the local operating system (e.g., Apple iOS™ or Android™). It may include further API's 117' to other local apps. It may further include instrumented execution code 118' where the instrumented part causes various pieces of meta-data to be embedded in the back and forth communication packets of the device 110'. Examples of such embedded meta-data may include indications of time of service-request, complexity/size of service-request, location where service-request was launched from, type of local OS, ID of cellular carrier and so forth. This embedded meta-data is picked up by backend enterprise servers and by monitoring agents thereof (e.g., embedded in servers such as 23n' but not shown). The picked up meta-data is used for determining system performance (for example, how long did it take from time of end-user request to complete the requested service?). In more detail, some of the embedded meta-data may be targeted for use by a SaaS backend agent such as indicated at 354/355. In accordance with one aspect of the present disclosure, the SaaS backend agent 354/355 may monitor for local permissions violations as detected by the various watchdog units/services (e.g., Watchdog1, Watchdog2, . . . WatchdogN) distributed throughout the system. The local permission lists and/or rules may be locally stored in the respective watchdog units and/or in the local servers (or network AP's) as indicated for example at 23n.3. Dynamic Connection-Making Mechanism software and/or hardware drivers (DCMM drivers) may be locally stored in the respective watchdog units and/or in the local servers (or network AP's) as indicated for example at 23n.4 where the watchdog units/services are provided with the ability to disable the drivers or divert their outputs when permission violations are detected (e.g., as in steps 264-265a-265d of FIG. 2B).

Typically, large systems such as 200' are subdivided into management-defined "sections". The size and resources inventory of each section is left to mangers of the system, but generally each section; where 340 is used here as an example of a system section, includes a limited number of intercoupled, "local" resources such as one or more local data processing units (e.g., CPU's 341), one or more local data storage units (e.g., RAM's 342, ROM's 343, Disks 346), one or more local data communication units (e.g., COMM units 347), and a local backbone (e.g., local bus 345) that operatively couples them together as well as optionally coupling them to yet further ones of local resources 348. The other local resources 348 may include, but are not limited to, specialized high speed graphics processing units (GPU's, not shown), specialized high speed digital signal processing units (DSPU's, not shown), custom programmable logic units (e.g., FPGA's, not shown), analog-to-digital interface units (A/D/A units, not shown), parallel data processing units (e.g., SIMD's, MIMD's, not shown), local user interface terminals (e.g., 354) and so on. If desired, watchdog units/services may be installed for a corresponding one or more Dynamic Connection-Making Mechanisms (DCMM's) of the SaaS center 340 and permission violations even of these local DCMM's may be tracked by an interactions tracker 351.

It is to be understood that various ones of the merely exemplary and illustrated, "local" resource units (e.g., 341-348) may include or may be differentiated into more refined kinds. For example, the local CPU's (only one shown as 341) may include single core, multicore and integrated-with-GPU kinds. The local storage units (e.g., 342, 343, 346) may include high speed SRAM, DRAM kinds as well as configured for reprogrammable, nonvolatile solid state data storage (SSD) and/or magnetic and/or other phase change kinds. The local communication-implementing units (only one shown as 347) may operatively couple to various external data communicating links such as serial, parallel, optical, wired or wireless kinds typically operating in accordance with various ones of predetermined communication protocols (e.g., internet transfer protocols, TCP/IP). Similarly, the other local resources (only one shown as 348) may operatively couple to various external electromagnetic or other linkages 348a and typically operate in accordance with various ones of predetermined operating protocols. Additionally, various kinds of local software and/or firmware (including that of watchdog units/services described herein and of the violation monitoring portions described herein) may be operatively installed in one or more of the local storage units (e.g., 342, 343, 346) for execution by the local data processing units (e.g., 341) and for operative interaction with one another. The various kinds of local software and/or firmware may include different operating systems (OS's), various security features (e.g., firewalls, DCMM watchdog units/services), different networking programs (e.g., web browsers), different application programs (e.g., word processing, emailing, spreadsheet, databases, etc.) and so on. A further example of such locally installed software and/or firmware units is shown in the magnification for cloud server 23n', where that server 23n' includes a respective server OS 23n.1 operatively installed therein and respective server security fences (e.g., firewalls) operatively installed therein. The locally installed software and/or firmware units my further include a server events log file generator 23n.2 which produces event logs including those which record interactions attempted by permission violating, dynamically connectable and disconnectable peripherals (DCP's) such as hot-plugged in USB devices. Not explicitly shown but also operatively installed in a behind-the-security-fences area of the server 23n is an operative browser (e.g., a web browser) that is configured to cooperatively interact with the local OS 23n.1 and with local network communication resources (not shown, see instead 347 of section 340). In one class of embodiments, the installed browser is provided with an ability to access hardware and software resources outside of the normal browser "sandbox" so that the browser, if appropriately instrumented, can provide remote monitoring and management (350) of the behaviors of local hardware and software resources of the server 23n, including providing access to its generated event log files 23n.2, to its local permission lists and/or rules 23n.3 and its local DCMM drivers 23n.4 for monitoring and/or modifying purposes.

In addition to, or in place of the interactions tracker 351, the SaaS center 340 may include an events database 352 which contains organized records of various events and activities within the system for use in real time situational analysis and or in off-line post-situation analysis. Various heuristically or otherwise developed expert knowledge rules may be stored in an expert knowledge base 250' of the SaaS center 340 and used for analyzing and/or developing permission rules including those to be used by the DCMM watchdog units/services of the system 200'. The stored rules may further include those for categorizing various types of violations including those intercepted by the DCMM watchdog units/services. The stored rules may further include those for reporting and resolving various issues including those related to permission violations intercepted by the DCMM watchdog units/services of the system 200'. It is to be understood that the illustrated human analyzer 355 can be replaced by an automated analyzer which relies for example on the expert rules knowledge database 250' for among other things, accessing over-time developed rules (e.g., heuristically developed rules) for resolving different issues within the monitored system 200'.

As may be appreciated by those skilled in the art in light of the foregoing, aspects of the present disclosure may be deemed to be defined in any of a number of patentable classes including that of any new and useful process, machine, manufacture, or composition of matter, or any new and useful improvement thereof. Aspects of the present disclosure may be implemented entirely hardware or at least partially in software (including firmware, resident software, micro-code, etc.) or by combining software and hardware implementation that may all generally be referred to herein as a "circuit," "module," "component," or "system." Furthermore, aspects of the present disclosure may take the form of a computer program product embodied in one or more computer readable media having computer readable and executable program code embodied thereon.

In addition to, or in place of the interactions tracker 351, the SaaS center 340 may include an events database 352 which contains organized records of various events and activities within the system for use in real time situational analysis and or in off-line post-situation analysis. Various heuristically or otherwise developed expert knowledge rules may be stored in an expert knowledge base 250' of the SaaS center 340 and used for analyzing and/or developing permission rules including those to be used by the DCMM watchdog units/services of the system 200'. The stored rules may further include those for categorizing various types of violations including those intercepted by the DCMM watchdog units/services. The stored rules may further include those for reporting and resolving various issues including those related to permission violations intercepted by the DCMM watchdog units/services of the system 200'. It is to be understood that the illustrated human analyzer 355 can be replaced by an automated analyzer which relies for example on the expert rules knowledge database 250' for among other things, accessing over-time developed rules (e.g., heuristically developed rules) for resolving different issues within the monitored system 200'.

As may be appreciated by those skilled in the art in light of the foregoing, aspects of the present disclosure may be deemed to be defined in any of a number of patentable classes including that of any new and useful process, machine, manufacture, or composition of matter, or any new and useful improvement thereof. Aspects of the present disclosure may be implemented entirely hardware or at least partially in software (including firmware, resident software, micro-code, etc.) or by combining software and hardware implementation that may all generally be referred to herein as a "circuit," "module," "component," or "system." Furthermore, aspects of the present disclosure may take the form of a computer program product embodied in one or more computer readable media having computer readable and executable program code embodied thereon.

It is to be understood that various ones of the merely exemplary and illustrated, "local" resource units (e.g., 341-348) may include or may be differentiated into more refined kinds. For example, the local CPU's (only one shown as 341) may include single core, multicore and integrated-with-GPU kinds. The local storage units (e.g., 342, 343, 346) may include high speed SRAM, DRAM kinds as well as configured for reprogrammable, nonvolatile solid state data storage (SSD) and/or magnetic and/or other phase change kinds. The local communication-implementing units (only one shown as 347) may operatively couple to various external data communicating links such as serial, parallel, optical, wired or wireless kinds typically operating in accordance with various ones of predetermined communication protocols (e.g., internet transfer protocols, TCP/IP). Similarly, the other local resources (only one shown as 348) may operatively couple to various external electromagnetic or other linkages 348a and typically operate in accordance with various ones of predetermined operating protocols. Additionally, various kinds of local software and/or firmware (including that of watchdog units/services described herein and of the violation monitoring portions described herein) may be operatively installed in one or more of the local storage units (e.g., 342, 343, 346) for execution by the local data processing units (e.g., 341) and for operative interaction with one another. The various kinds of local software and/or firmware may include different operating systems (OS's), various security features (e.g., firewalls, DCMM watchdog units/services), different networking programs (e.g., web browsers), different application programs (e.g., word processing, emailing, spreadsheet, databases, etc.) and so on. A further example of such locally installed software and/or firmware units is shown in the magnification for cloud server 23n', where that server 23n' includes a respective server OS 23n.1 operatively installed therein and respective server security fences (e.g., firewalls) operatively installed therein. The locally installed software and/or firmware units my further include a server events log file generator 23n.2 which produces event logs including those which record interactions attempted by permission violating, dynamically connectable and disconnectable peripherals (DCP's) such as hot-plugged in USB devices. Not explicitly shown but also operatively installed in a behind-the-security-fences area of the server 23n is an operative browser (e.g., a web browser) that is configured to cooperatively interact with the local OS 23n.1 and with local network communication resources (not shown, see instead 347 of section 340). In one class of embodiments, the installed browser is provided with an ability to access hardware and software resources outside of the normal browser "sandbox" so that the browser, if appropriately instrumented, can provide remote monitoring and management (350) of the behaviors of local hardware and software resources of the server 23n, including providing access to its generated event log files 23n.2, to its local permission lists and/or rules 23n.3 and its local DCMM drivers 23n.4 for monitoring and/or modifying purposes. In addition to, or in place of the interactions tracker 351, the SaaS center 340 may include an events database 352 which contains organized records of various events and activities within the system for use in real time situational analysis and or in off-line post-situation analysis. Various heuristically or otherwise developed expert knowledge rules may be stored in an expert knowledge base 250' of the SaaS center 340 and used for analyzing and/or developing permission rules including those to be used by the DCMM watchdog units/services of the system 200'. The stored rules may further include those for categorizing various types of violations including those intercepted by the DCMM watchdog units/services. The stored rules may further include those for reporting and resolving various issues including those related to permission violations intercepted by the DCMM watchdog units/services of the system 200'. It is to be understood that the illustrated human analyzer 355 can be replaced by an automated analyzer which relies for example on the expert rules knowledge database 250' for among other things, accessing over-time developed rules (e.g., heuristically developed rules) for resolving different issues within the monitored system 200'.

As may be appreciated by those skilled in the art in light of the foregoing, aspects of the present disclosure may be deemed to be defined in any of a number of patentable classes including that of any new and useful process, machine, manufacture, or composition of matter, or any new and useful improvement thereof. Aspects of the present disclosure may be implemented entirely hardware or at least partially in software (including firmware, resident software, micro-code, etc.) or by combining software and hardware implementation that may all generally be referred to herein as a "circuit," "module," "component," or "system." Furthermore, aspects of the present disclosure may take the form of a computer program product embodied in one or more computer readable media having computer readable and executable program code embodied thereon.

Any combination of one or more computer readable media may be utilized. A computer readable storage medium may be, for example, but not limited to, in the form of an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code which programs a processor for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to various embodiments of the disclosure. It will be understood that each block of the flowchart illustrations and/or block diagrams described above, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, processor, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art in light of the foregoing but without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A machine-implemented method comprising:
automatically detecting an attempt to connect a dynamically connectable and disconnectable peripheral (DCP) to a front end of a Dynamic Connection-Making Mechanism (DCMM) in a manner where after the attempted connection making operation succeeds, the DCP can next attempt to gain access through the connection-providing DCMM to one or more targetable data processing devices or services reachable by way of a backend of the connection-providing DCMM, the automatic detecting being carried out by a watchdog configured to watch connection making operations of the DCMM, to watch attempts at gaining access through the DCMM to one or more of the targetable data processing devices or services and to selectively intercept access attempting signals passing through the connection-providing DCMM so as to perform at least one of blocking and diverting the access gaining attempts made through the connection-providing DCMM;
automatically determining if the attempted connection making operation is in accordance with connection permissions and connection rules assigned to the watchdog, wherein the automatic determining is performed by the watchdog watching a connection making operation carried out between the DCMM and the connection attempting DCP whereby after a successful connection making operation, the DCMM provides connection through the DCMM so that the DCP can next attempt to gain access through the connection-providing DCMM to the one or more targetable data processing devices or services; and
in response to determination by the watchdog that at least one of the attempted connection making operation and a subsequent attempt to gain access is not in accordance with the connection permissions and connection rules assigned to the watchdog, not allowing an operatively effective connection and gaining of access to be actually made through the connection-providing DCMM and then from the backend of the DCMM to respectively targeted ones of the one or more targetable data processing devices or services.

2. The method of claim 1, wherein
the watchdog watched connection making operation includes the DCMM cooperating with the DCP in accordance with a connection-making protocol that queries the DCP as to the type of the attempted connection.

3. The method of claim 2, wherein
the DCMM is wirelessly connectable to by way of a connection-making protocol that allows for wireless connection-making between the DCP and the DCMM.

4. The method of claim 3, wherein:
the at least one of the local list of connection permissions and the connection rules prohibits dynamic connection-making to a user physical input and/or output device.

5. The method of claim 1, wherein:
at least one of the assigned connection permissions and the connection rules prohibits dynamic connection-making at predetermined times specified by the at least one of the assigned connection permissions and the connection rules.

6. The method of claim 1, wherein:
at least one of the assigned connection permissions and the connection rules prohibits dynamic connection-making when predetermined machine states of the locale of the DCMM are one of being either present or not present during the connection making operation, the predetermined machine states being specified by the at least one of the assigned connection permissions and the connection rules.

7. The method of claim 3, wherein:
at least one of the assigned connection permissions and the connection rules prohibits dynamic connection-making when pre-identified users are determined to be one of being present or not present at the locale of the DCMM during the connection making operation, identifications of the pre-identified users being specified by the at least one of the assigned connection permissions and the connection rules.

8. The method of claim 7, wherein one of the pre-identified users that needs to be present during the attempted connection-making is a pre-identified service technician.

9. The method of claim 3, and further comprising:
in response to determination that the attempted connection making is not in accordance, generating an alarm.

10. The method of claim 1, and further comprising:
in response to determination that the attempted connection making is not in accordance, carrying out a faked connection-making and continuance process rather than said operatively effective connection and gaining of access to thereby give the DCP or a user thereof an impression that the attempted-at effective connection and gaining of access succeeded even though the attempted-at gaining of access was diverted to the faked connection-making and continuance process.

11. The method of claim 10, and further comprising:
after the faked connection-making and continuance process begins to give said impression of success, recording interactions carried out or attempted to be carried out by the DCP.

12. An automated machine system comprising:
at least one watchdog unit and/or watchdog software service that is configured to automatically detect an attempt to connect a dynamically connectable and disconnectable peripheral (DCP) to and through a watchdog-watched Dynamic Connection-Making Mechanism (DCMM) of the machine system, where in cases where the attempted connection making operation succeeds, the DCP is then operatively connected to a front end of the DCMM such that the DCP can next attempt to gain access through the connection-providing DCMM to one or more targetable data processing devices or services reachable by way of a backend of the connection-providing DCMM,
wherein the at least one watchdog unit and/or watchdog software service is further configured to watch the connection making operations of the DCMM, to watch attempts at gaining access through the DCMM to the one or more targetable data processing devices or services, and to selectively intercept access attempting signals passing through the connection-providing DCMM so as to perform at least one of blocking and diverting the access gaining attempts made through the connection-providing DCMM; and wherein the at least one watchdog unit and/or software service is further configured to automatically determine if a type of an attempted connection is in accordance with at least one of a local list of connection permissions and connection rules assigned to the watchdog unit and/or software service; and the automated machine system further includes a storage storing the at least one of a local list of connection permissions and connection rules assigned to the watchdog unit and/or software service.

13. The machine system of claim 12, wherein:

in response to determination that an attempted connection making operation is not in accordance, the at least one watchdog unit and/or software service is further configured to not allow an operatively effective connection to be actually made by way of the backend of the watchdog-watched DCMM to one or more of the targetable data processing devices or services that the DCP seeks to interact with.

14. The machine system of claim 12, wherein:

the at least one of a local list of connection permissions and connection rules is remotely modifiable.

15. The method of claim 1, wherein a remote administrative controller is operatively coupled to at least one of the watchdog, a wireless access point (AP) watched by the watchdog, and the DCMM such that the remote administrative controller can remotely access and remotely modify at least one of a stored list of allowable connection permissions and a stored set of connection rules assigned to the watchdog and held by at least one of the watchdog, the AP or the DCMM; and in response to determination by the watchdog that the attempted connection making operation is not in accordance with least one of the remotely modified and stored list of allowable connection permissions and the stored set of connection rules, not allowing an operatively effective connection to be actually made by way of the DCCM to the one or more targetable data processing devices or services.

16. The method of claim 15, and further comprising:

in response to determination by the watchdog that the attempted connection making operation is in accordance with least one of the assigned list of allowable connection permissions and if applicable, also associated ones of the assigned set of connection rules, creating a temporary set of granted permissions that allow the connection to be made pursuant to the temporary set of granted permissions;

while the allowed connection continues, automatically repeatedly testing the allowed connection for compliance with the temporary set of granted permissions;

in response to determination by the automatically repeated testing that the temporary set of granted permissions has been violated, generating an alert report;

automatically repeatedly testing the allowed connection for an attempt at disconnection; and in response to determination by the automatically repeated testing for an attempt at disconnection that a disconnection has been attempted, deleting the temporary set of granted permissions and discontinuing the allowed connection.

17. The method of claim 16, and further comprising:

in response to determination by the automatically repeated testing that the temporary set of granted permissions has been violated, switching to operating in accordance with a created but faked set of permissions rather than said operatively effective connection to thereby give the DCP or a user thereof an impression that the violation during the continuance of the connection was not detected.

18. The method of claim 17, wherein:

the switching to operating in accordance with the created but faked set of permissions is accompanied by use of an alternate DCMM software driver that diverts DCCM traffic to an alternate data processing device rather than to the data processing device intended by operation of the DCP.

* * * * *